United States Patent

[11] 3,536,161

| [72] | Inventor | Jesse E. Clarke<br>Hinsdale, Illinois |
|---|---|---|
| [21] | Appl. No. | 758,479 |
| [22] | Filed | Sept. 9, 1968 |
| [45] | Patented | Oct. 27, 1970 |
| [73] | Assignee | Autoquip Corporation<br>Chicago, Illinois<br>a corporation of Illinois |

[54] PORTABLE SERVICING LIFT FOR VEHICLE
11 Claims, 5 Drawing Figs.

[52] U.S. Cl. .................................................. 187/8.59,
187/8.41, 187/9; 214/394
[51] Int. Cl. ...................................................... B60s 13/00
[50] Field of Search .................................. 187/8.41—8.59,
9, 11, 12; 214/392, 394

[56] References Cited
UNITED STATES PATENTS

| 620,585 | 3/1899 | Hayes ........................... | 187/9 |
| 2,827,979 | 3/1958 | Thompson ..................... | 187/8.41 |
| 3,338,334 | 8/1967 | Matthews ...................... | 187/8.59 |
| 3,395,777 | 8/1968 | Rodosta ........................ | 187/8.59 |

Primary Examiner—Harvey C. Hornsby
Attorney—Darbo, Robertson and Vandenburgh

ABSTRACT: A vehicle lift has an overhead frame with four box legs extending downwardly therefrom. Each of the legs has a traveler mounted for movement longitudinally of the leg and raised or lowered with a hydraulic cylinder. At the bottom of each traveler is a wheel to support the lift when the traveler is in the lowered position. Carried by the bottom of each traveler is a vehicle supporting means.

Patented Oct. 27, 1970

Inventor:
Jesse E. Clarke

By:
Darbo, Robertson & Vandenburgh

Attys.

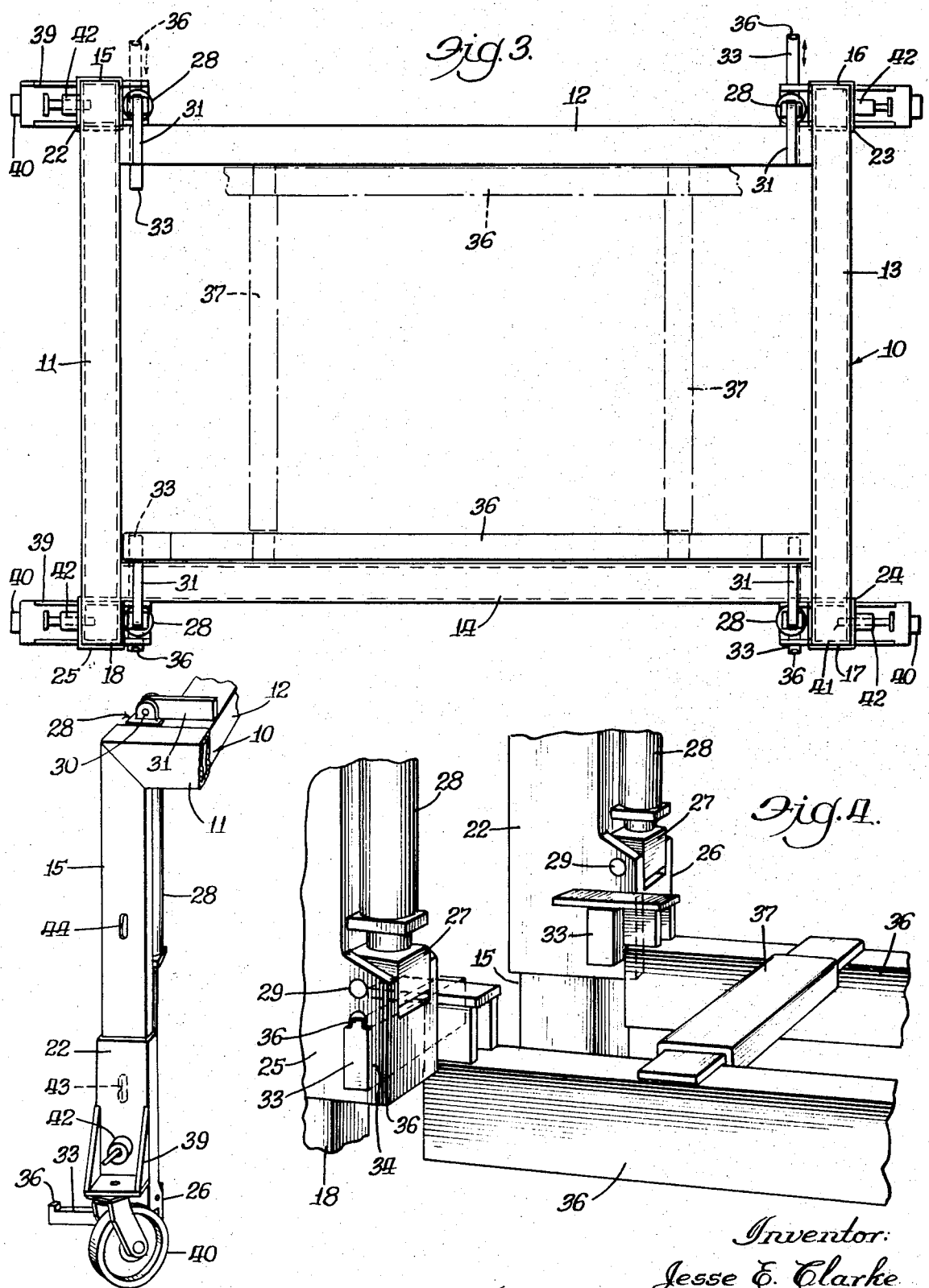

PORTABLE SERVICING LIFT FOR VEHICLE

BACKGROUND OF THE INVENTION

Many places of business have numerous special vehicles, which may be of diverse configurations, that require periodic or special servicing. For example, fork lift trucks and special small tractors (for pulling trailers and the like) are common in innumerable places of business. In addition to the regular maintenance servicing such vehicles, they will at times break down at a point remote from the maintenance department so that the servicing must be done at a point other than at the established location for vehicle servicing. The fact that the vehicles, even in a single plant, may have substantial variations in physical configurations dictates the desirability of a vehicle lift which is capable of lifting innumerable different types of equipment. The present invention is directed to providing a vehicle lift which can be moved from location to location to service a wide variety of such vehicles. Another important advantage is the stability of the lift when it is in use. This, of course, contributes to meeting plant safety requirements.

One special application of the invention is in the servicing of vehicles used on shipboard. Here the makeshift application of the shipboard mechanisms have proven impractical for raising vehicles for servicing. Embodiments of the invention are stable with a raised vehicle even despite a substantial roll of the ship. It can be used with numerous styles and types of vehicles. It is not a fixed installation, but can be readily moved about. This permits it to go to a disabled vehicle which requires servicing and which cannot be readily moved. Further objects and advantages will become apparent from the following description taken in conjunction with the drawings.

DESCRIPTION OF THE DRAWINGS

FIG. 3 is a plan view of the embodiment of FIGS. 1 and 2;

FIG. 4 is an enlarged partial perspective view illustrating particularly the vehicle supporting means; and FIG. 5 is a fragmentary perspective view of a leg of the embodiment and the traveler, etc., mounted thereon.

SUMMARY OF THE INVENTION

Figure 1:
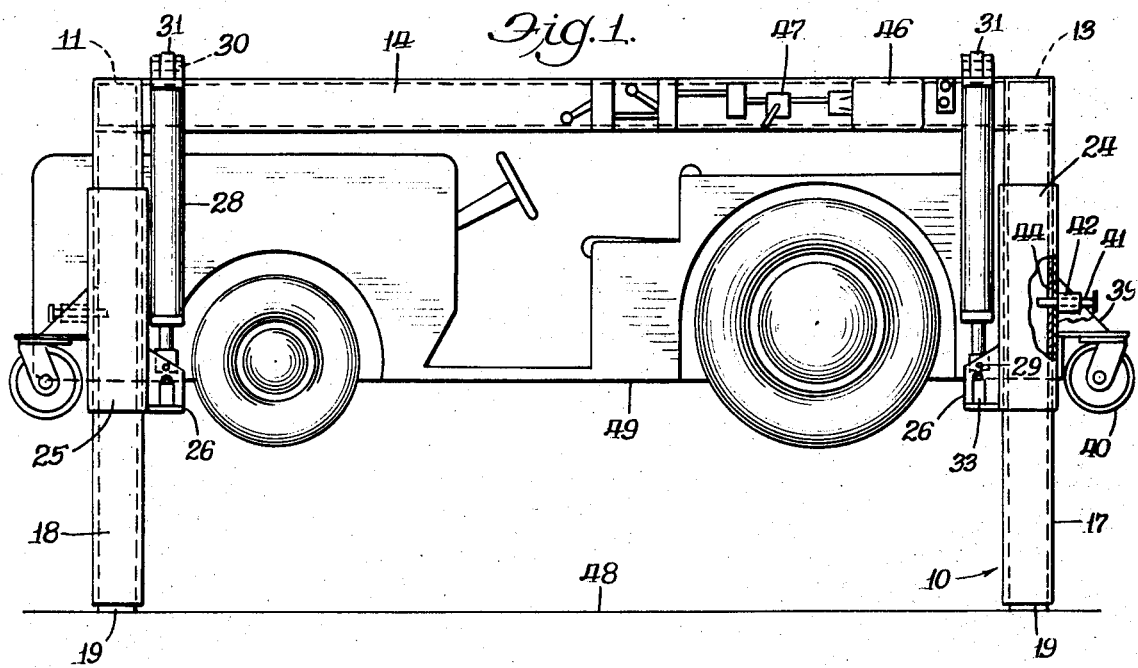
FIG. 1 is an elevational view of an embodiment of the invention supporting a vehicle for servicing.

The present invention relates to a vehicle lift particularly adapted for plant servicing of vehicles such as fork lift trucks and the like, which lift is readily moved about but which is stable when supporting a vehicle.

DESCRIPTION OF THE SPECIFIC EMBODIMENT

Al though the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

The illustrated embodiment comprises a frame generally 10. This frame includes an overhead rectangular support formed by four sides 11—14 on which are secured four legs 15—18. Each leg has a pad-like foot 19, which may be formed, for example, of synthetic rubber. The frame is all formed of boxlike sections securely welded together. The legs are outboard of two of the sides.

Mounted on each of the legs 15—18 respectively is a traveler or reciprocating member 22—25 respectively. Travelers 22—25 are in the form of sleeves having a rectangular internal opening to receive the respective leg and permit the traveler to move longitudinally of the leg, i.e. vertically. At the base of each leg is a connecting member 26. The piston rod end 27 of hydraulic cylinders 28 is secured to connecting member 26 by a pin 29. At their upper ends, cylinders 28 are connected by a pin 30 to a projection 31 forming a part of frame 10.

Arms 33 form a part of a supporting means for a vehicle. Arms 33 are mounted in ways 34 in connecting members 26 so that the arms may be moved longitudinally thereof (horizontally). Arms 33 have a finger 36 at the outer end thereof to prevent them from being moved too far in the ways. A pair of longitudinal rails 36 may be supported on arms 33, as best seen in FIG. 4. A pair of cross rails 37 may be inserted between longitudinal rails 36.

Brackets 39 are secured to each of travelers 22—25. Caster type wheel means 40 are secured to each of the four mounting brackets 39. A pin 41 is slideably mounted in a sleeve 42 secured to each of travelers 22—25. Legs 15—18 have a pair of openings 43 and 44 therein which are positioned for registry with pins 41, as seen particularly in FIG. 5.

Cylinders 28 are suitably connected to a source of hydraulic fluid mounted on frame 10. Illustrated in FIGS. 1 and 2 is the electrically powered pump 46 and valve 47 of this hydraulic fluid source.

By actuation of the controls of the hydraulic fluid source, the pistons of cylinder 28 may be extended so that the apparatus is supported on wheels 40 from a suitable floor or surface 48 with the pads 19 of the legs 18 raised from the surface 48. This position is illustrated in FIG. 2. In this position the apparatus is readily movable about the plant floor, deck or other supporting surface merely by pushing on it by hand. Thus, for example, it may be moved to a location at which there is a disabled vehicle to be serviced.

With the apparatus positioned over the vehicle, the arms 33 are moved inwardly (toward each other) below suitable supporting points on the vehicle. The hydraulic control apparatus may then be actuated to simultaneously raise travelers 22—25 along legs 15—18. During the initial portion of this movement the legs 18 actually move downwardly so that they come to bear on the supporting surface 48 transferring the load from the wheels 40 directly to the legs. Thereafter, as the travelers move upwardly along the legs the arms 33 come to bear against the underside of the vehicle 49 and then raise the vehicle toward the position illustrated in FIG. 1. With the vehicle raised to the FIG. 1 position, pins 41 may be slid inwardly so that they enter holes 44 in legs 15—18. This insures that an accident, such as a sudden loss of hydraulic pressure, will not permit the vehicle to descend while it is being serviced. If it were not necessary for the servicemen to get entirely under the vehicle, as for example if a tire were to be changed, the vehicle would be raised only a short distance above the surface 48 and the pins 41 inserted into openings 43 in the legs.

Figure 2:
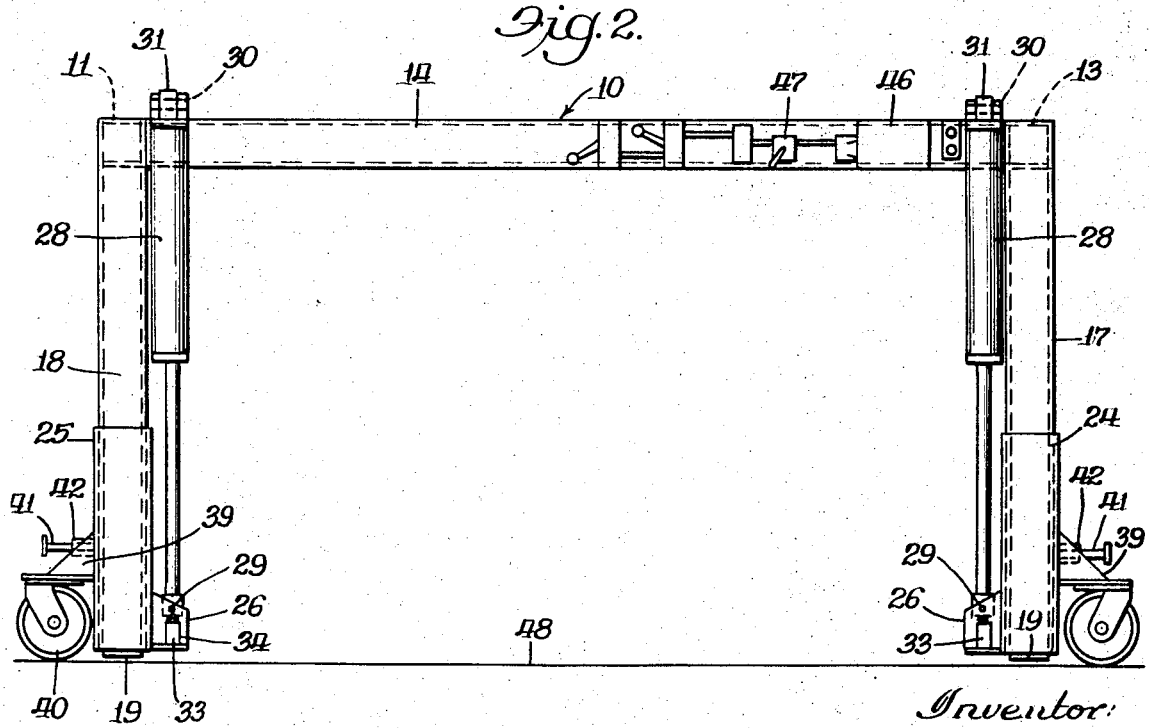
FIG. 2 is a view corresponding to FIG. 1 but without the vehicle and with the embodiment supported on its own wheels for movement.

When the servicing of the vehicle has been completed, pins 41 are withdrawn from the leg openings and the hydraulic system actuated to simultaneously lower travelers to approximately the FIG. 2 position so that the vehicle rests on surface 48. Without again actually raising the apparatus onto wheels 40, the vehicle 49 may be driven from within the apparatus to be put back into use. Under normal circumstances the apparatus would remain stationary on pads 19 at a principal servicing location and the vehicles brought to it. However, as has already been pointed out, it can be moved from such a central servicing location when necessary. So long as the apparatus is resting on pads 19 it will stay firmly in place and resist a substantial roll of the ship. Embodiments of the invention have supported vehicles, as illustrated in FIG. 1, and remain stable despite a 30° roll of the ship.

With some vehicles the situation may exist that the arms 33 will not reach suitable lifting points on the vehicle. This would be particularly the case with vehicles substantially smaller than that illustrated in FIG. 1. In that event, longitudinal rails 36 may be laid over arms 33, as best illustrated in FIGS. 3 and 4. Thereafter, cross rails 37 are suitably positioned on the longitudinal rails 36 so as to be under suitable pickup points on the vehicle. The vehicle is then raised following the procedure described in connection with FIG. 1.

I claim:

1. A portable vehicle servicing lift comprising:

a main frame having a portion at a height sufficient to extend above the vehicle, said frame including at least three leg members attached to and extending down from said portion in positions beyond the space to be occupied by the vehicle, said main frame holding said leg members rigidly in the upright position;

a corresponding plurality of reciprocating members, each of said reciprocating members forming a pair with a respective one of the leg members, being mounted on the respective leg member and movable longitudinally of the leg member;

one of each of the members of each said pairs of members being tubular and being external of the other member of the pair;

wheels secured to the bottom of each of the reciprocating members to movably support the lift when the reciprocating members are in the lowered position;

power means interconnecting the frame and the reciprocating members to adjust the position of the reciprocating members along the leg members;

vehicle supporting means carried by the reciprocating member and adapted to extend under the vehicle; and whereby with said supporting means under the vehicle said reciprocating members may be raised and lowered to raise and lower the vehicle with said frame resting on said legs, and with said reciprocating members lowered to support said frame on said wheels said lift may be moved about on said wheels.

2. A lift as set forth in claim 1, wherein said frame is rectangular having four corners and a leg extending downwardly at each of said corners.

3. A lift as set forth in claim 2, wherein said rectangular frame has two pair of side members, said legs being outboard of the side members of one pair, said power means including four hydraulic cylinders each with one end thereof affixed to a respective side member of said one pair of side members and the other end of each hydraulic cylinder being affixed to a respective reciprocating member, said hydraulic cylinders being outboard of said one pair of side members.

4. A lift as set forth in claim 3, wherein said reciprocating members are outside of said leg members, said leg members are square in external configuration as seen in a horizontal cross section, and said wheels are attached to said reciprocating members with the bottoms of the wheels slightly below the bottoms of the reciprocating members.

5. A lift as set forth in claim 4, wherein said supporting means including an arm for each of the pairs of members, each arm being positioned approximately horizontal and being received in a respective reciprocating member for movement longitudinally of the arm.

6. A lift as set forth in claim 5, wherein said supporting means includes a pair of removable longitudinal supports, each longitudinal support resting upon two of said arms, and a pair of removable cross supports, each cross support resting on and extending between two longitudinal supports.

7. A lift as set forth in claim 6, wherein said power means includes an electrically operated hydraulic pump means mounted on said frame and connected to said cylinders.

8. A lift as set forth in claim 1, wherein said reciprocating members are outside of said leg members, said leg members are square in external configuration as seen in a horizontal cross section, and said wheels are attached to said reciprocating members with the bottoms of the wheels slightly below the bottoms of the reciprocating members.

9. A lift as set forth in claim 8, wherein said supporting means including an arm for each of the pairs of members, each arm being positioned approximately horizontal and being received in a respective reciprocating member for movement longitudinally of the arm.

10. A lift as set forth in claim 9, wherein said supporting means includes a pair of removable longitudinal supports, each longitudinal support resting upon two of said arms, and a pair of removable cross supports, each cross support resting on and extending between two longitudinal supports.

11. A lift as set forth in claim 1, wherein said power means includes a plurality of hydraulic cylinders, each cylinder interconnecting the frame and a reciprocating member of a respective pair, and an electrically operated hydraulic pump means mounted on the frame and connected to said cylinders for simultaneous actuation of the cylinders.